United States Patent
Han et al.

(10) Patent No.: US 7,313,325 B2
(45) Date of Patent: Dec. 25, 2007

(54) CHANNEL ALLOCATION METHOD IN MULTIRATE WDM SYSTEM

(75) Inventors: Jin Soo Han, Daejeon (KR); Sang Soo Lee, Daejeon (KR); Seung Kwan Kim, Daejeon (KR); Moo Jung Chu, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 745 days.

(21) Appl. No.: 10/673,730

(22) Filed: Sep. 29, 2003

(65) Prior Publication Data

US 2004/0114627 A1   Jun. 17, 2004

(30) Foreign Application Priority Data

Dec. 17, 2002   (KR) ............... 10-2002-0080826

(51) Int. Cl.
  H04B 10/08   (2006.01)
  H04B 10/12   (2006.01)
  H04J 14/02   (2006.01)
(52) U.S. Cl. .................... 398/25; 398/33; 398/81; 398/147
(58) Field of Classification Search .............. 398/9, 398/25, 26, 27, 31, 33, 79, 81, 147, 158
  See application file for complete search history.

(56) References Cited

U.S. PATENT DOCUMENTS

| 6,449,069 B1* | 9/2002 | Fujita .................... 398/43 |
| 6,580,536 B1* | 6/2003 | Chraplyvy et al. .......... 398/79 |
| 7,088,922 B2* | 8/2006 | Tomofuji et al. .......... 398/95 |
| 2003/0007723 A1* | 1/2003 | Roux et al. .............. 385/24 |

FOREIGN PATENT DOCUMENTS

| KR | P1999-009278 | 2/1999 |
| KR | P2001-0057213 | 7/2001 |

OTHER PUBLICATIONS

1998 IEEE, "Effect of Group Velocity Dispersion on Stimulated Raman Crosstalk in Multichannel Transmission Systems", J. Wang, et al., vol. 10, No. 4 Apr. 1998, 3 pgs.
Photonics Conference 2002, "Stimulated Raman Scattering-induced Band-to-Band crosstalk Effects in multrate WDM link", J. Han, et al., (with English translation).
IEEE Photonics Technology Letters, vol. 7, No. 1, Jan. 1995, "Effect of Modulation Statistics on Raman Crosstalk in WDM Systems", 3 pages.
OFC '94 Technical Digest, "Bandwidth of cross talk in Raman amplifiers", 2 pages.

* cited by examiner

*Primary Examiner*—Dalzid Singh
(74) *Attorney, Agent, or Firm*—Blakely, Sokoloff, Taylor & Zafman

(57) ABSTRACT

A channel allocation method of channels having different transmission speeds in a wavelength division multiplexing (WDM) system is provided. The channel allocation method in a multirate optical transmission system includes selecting a channel having the lowest transmission speed from not allotted channels, allotting the selected channel to the longest wavelength band of empty wavelength bands, and determining whether not allotted channels exist in order to repeatedly perform selecting the channel having the lowest transmission speed from the not allotted channels and allotting the selected channel to the longest wavelength band of the empty wavelength bands, until all the channels are allotted.

2 Claims, 3 Drawing Sheets

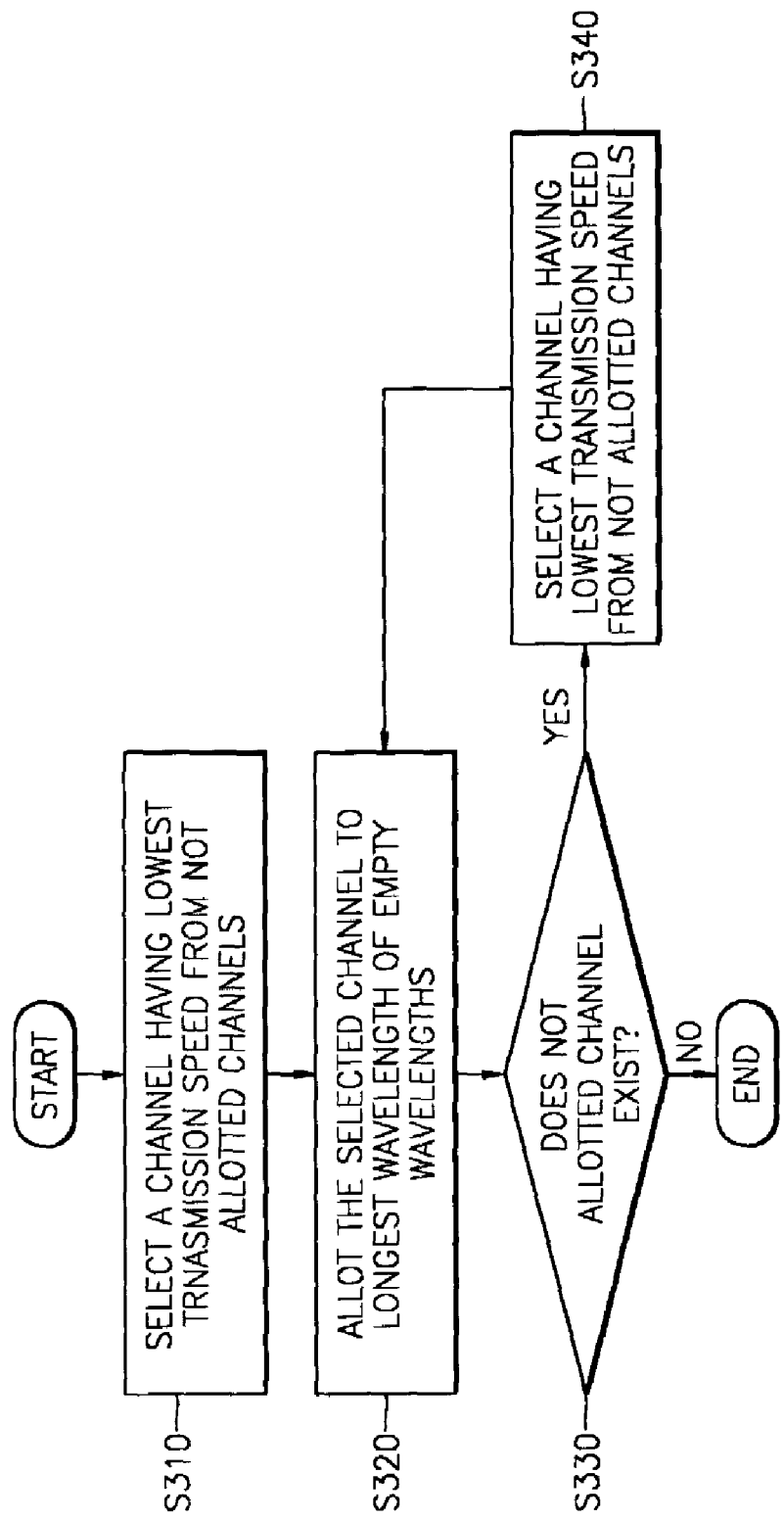

CHANNEL ALLOCATION METHOD IN MULTIRATE WDM SYSTEM

BACKGROUND OF THE INVENTION

This application claims the priority of Korean Patent Application No. 2002-80826, filed on Dec. 17, 2002, in the Korean Intellectual Property Office, which is incorporated herein in its entirety by reference.

1. Field of the Invention

The present invention relates to a channel allocation method, and more particularly, to a channel allocation method of channels having different transmission speeds in a wavelength division multiplexing (WDM) system.

2. Description of the Related Art

A plurality of methods have been used for a WDM system to prevent performance degradation due to a nonlinear effect. Examples of these methods include using a large dispersion fiber to reduce a walk-off length so as to reduce the interaction between channels, using a large effective core area fiber to reduce a nonlinear coefficient, and inducing the lowest optical power to a fiber to reduce a nonlinear effect due to optical power.

When a large number of channels over a wide band are used, a stimulated Raman scattering (SRS) effect among various nonlinear effects largely affects the transmission quality; however, the above-methods do not consider the effects of a Raman crosstalk according to the channel speed in the multirate WDM system.

SUMMARY OF THE INVENTION

The present invention provides a channel allocation method for minimizing performance degradation due to a Raman crosstalk by allotting a channel having a high transmission speed to a short wavelength band and a channel having a low transmission speed to a long wavelength band, in a multirate wavelength division multiplexing (WDM) system.

According to an aspect of the present invention, there is provided a channel allocation method in a multirate optical transmission system, the method comprising receiving optical signals via a plurality of channels and selecting a channel having the lowest transmission speed from not allotted channels; allotting the selected channel to the longest wavelength band of empty wavelength bands; and determining whether not allotted channels yet exist in order to repeatedly perform selecting the channel having the lowest transmission speed from the not allotted channels and allotting the selected channel to the longest wavelength band of the empty wavelength bands, until all the channels are allotted

BRIEF DESCRIPTION OF THE DRAWINGS

The above aspects and advantages of the present invention will become more apparent by describing in detail a preferred embodiment thereof with reference to the attached drawings in which:

FIG. 3 is a flowchart for explaining a channel allocation method according to the present invention.

DETAILED DESCRIPTION OF THE INVENTION

The present invention will now be described more fully with reference to the accompanying drawings, in which a preferred embodiment of the invention is shown.

Figure 1:
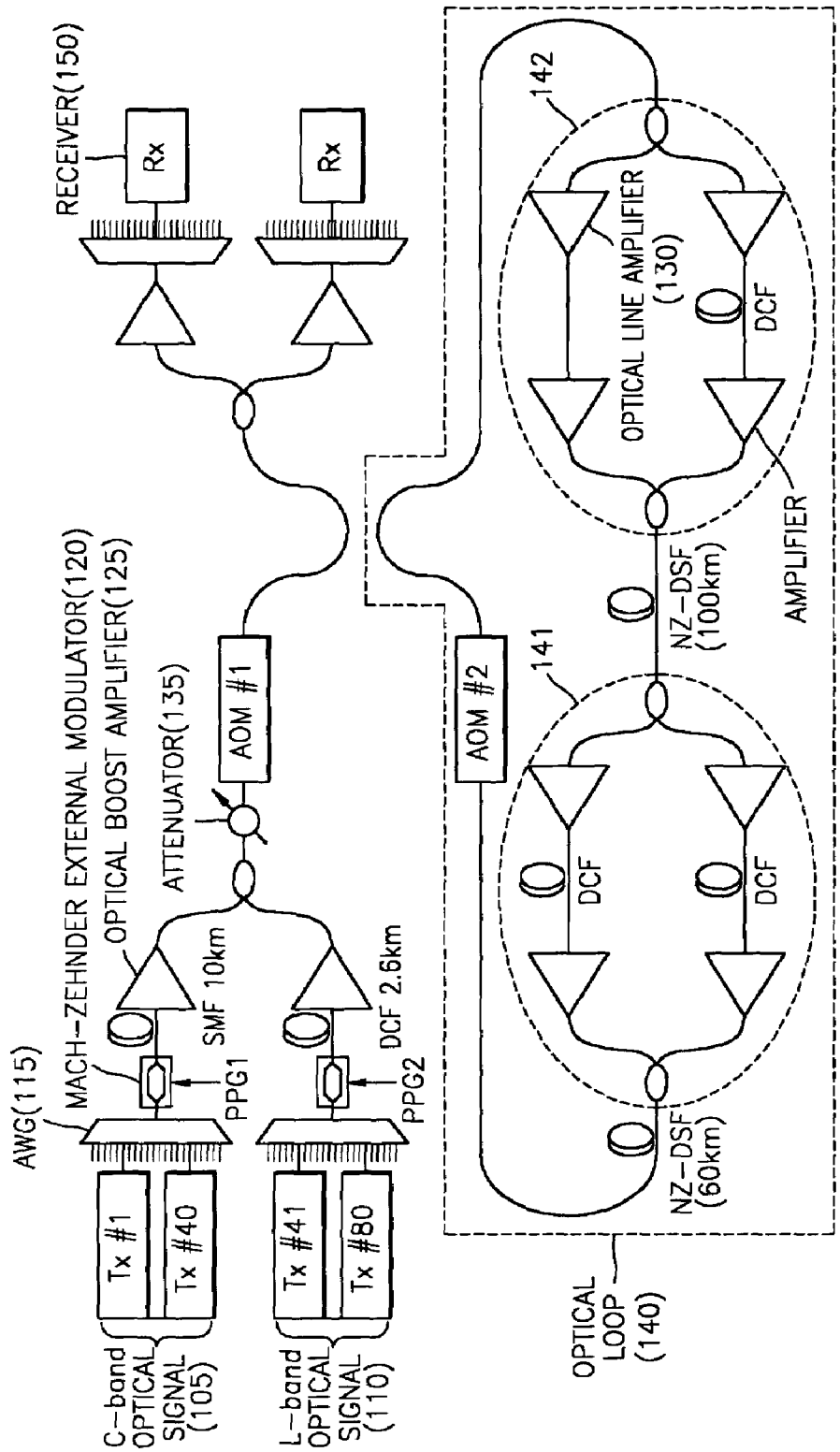
FIG. 1 is a block diagram illustrating an experimental apparatus for measuring the transmission performance of an optical transmission system having different band transmission speeds.

FIG. 1 is a block diagram illustrating an experimental apparatus for measuring the transmission performance of an optical transmission system having different band transmission speeds.

In other words, FIG. 1 is a block diagram illustrating an experimental apparatus for measuring the difference in the transmission performance when the band transmission speeds are different in a wavelength division multiplexing (WDM) system. Here, input optical sources include 40-channel C-band optical signals 105 of a short wavelength band where the channels have an interval of 100 GHz in a range from 1530.334 to 1561.419 nm and 40-channel L-band optical signals 110 of a long wavelength band where the channels have an interval of 100 GHz in a range from 1571.239 to 1604.026 nm.

In addition, the optical signals 105 and 110 are multiplexed by arrayed waveguide gratings (AWGs) 115. Thereafter, the multiplexed signals are input to Mach-Zender external modulators 120 according to the band of the signals and modulated by pusle pattern generators PPG1 and PPG2. In order to prevent the relationship between the channels due to using one modulator, the C-band optical signals 105 are transmitted through a single mode fiber (SMF) of 10 km and the L-band optical signals 110 are transmitted through a dispersion compensating fiber (DCF) of 2.6 km, and input to optical boost amplifiers 125. The signals amplified by the optical boost amplifiers 125 are attenuated by an attenuator 135 to satisfy the input conditions of optical line amplifiers 130 of a next stage, and input to an optical recirculating loop 140. The optical recirculating loop 140 consists of two dual-stage amplifiers 141 and 142, and non-zero dispersion-shifted fibers (NZ-DSF) of 100 km and 60 km. Here, the loss of the fibers is 0.22 dB/km. The span loss in the optical recirculating loop 140 is 22 dB, and the optical launching power per channel is +4 dBm.

In order to compensate the dispersion generated in the NZ-DSFs, DCFs are inserted into the dual-stage amplifiers 141 and 142 in the optical recirculating loop 140. After three turn of the recirculating loop, transmission over 480 km of NZ-DSF, the residual dispersion of the C-band is 300 to 800 ps/nm and the residual dispersion of the L-band is 40 to 520 ps/nm. Here, P-I-N receivers are used as the receivers 150, and the optical power of the signals input to the receivers 150 is −9 dBm. The final transmission performance Q is measured in the receivers 150 to evaluate the transmission performance of the apparatus. Here, the transmission performance Q is calculated using Equation 1 as follows. In addition, the transmission performance Q is an example of a bit error rate (BER).

$$BER(Q) = \frac{1}{\sqrt{2\pi}} \int_Q^\infty \exp\left(-\frac{x^2}{2}\right) dx \quad (1)$$

When the transmission performance Q is larger than 3, an approximate transmission performance Q can be calculated using Equation 2 as follows.

$$BER(Q) \cong \frac{1}{\sqrt{2\pi}} \frac{\exp\left(-\frac{Q^2}{2}\right)}{Q} \quad (2)$$

Figure 2A:
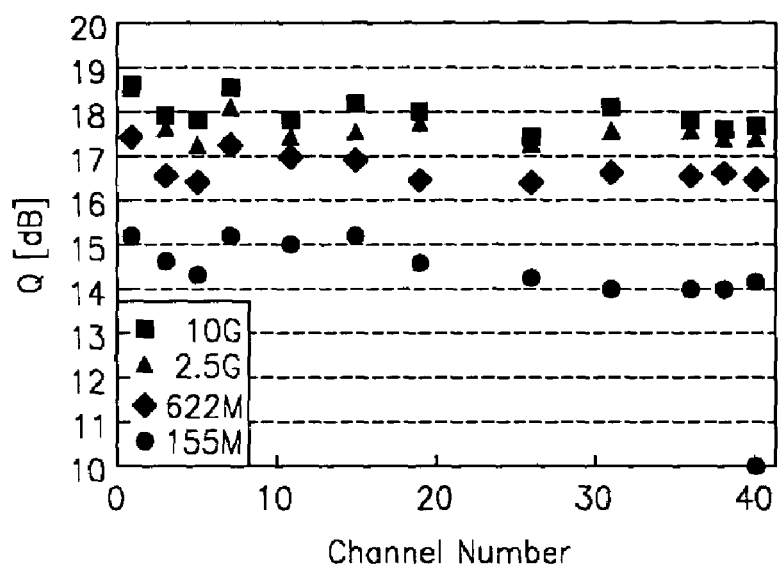
FIGS. 2A and 2B are graphs illustrating transmission performances of an optical transmission system having different band transmission speeds.
Figure 2B:
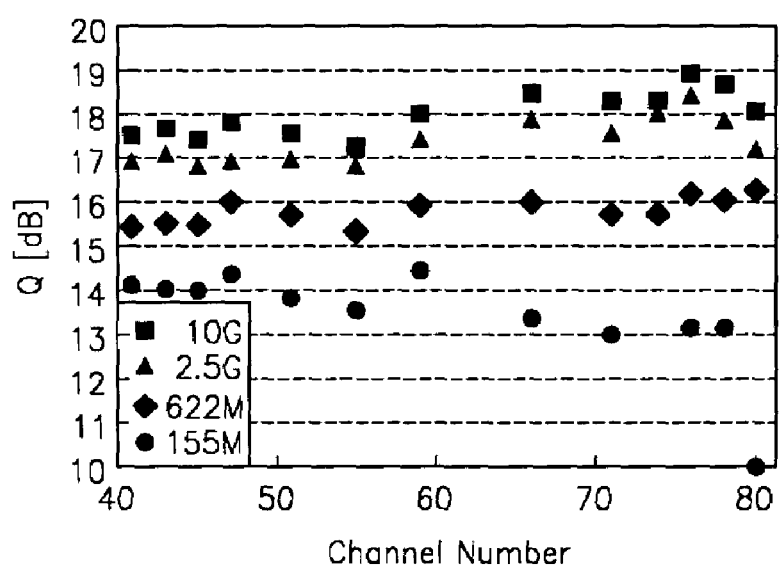

FIGS. 2A and 2B are graphs illustrating the transmission performance in the optical transmission system having different band transmission speeds.

In other words, the graphs of FIGS. 2A and 2B are obtained by varying the transmission speeds of the optical signals in the apparatus of FIG. 1. The graph of FIG. 2A illustrates transmission performances when varying the transmission speed of the L-band optical signals to 155 Mb/s, 622 Mb/s, 2.5 Gb/s, and 10 Gb/s while fixing the transmission speed of the C-band optical signals at 10 Gb/s. The graph of FIG. 2B illustrates the transmission performances when varying the transmission speed of the C-band optical signals to 155 Mb/s, 622 Mb/s, 2.5 Gb/s, and 10 Gb/s while fixing the transmission speed of the L-band optical signals at 10 Gb/s.

Referring to FIGS. 2A and 2B, the average Q penalties of the C-band signals are 0.2 dB, 1.1 dB, and 3.4 dB when the transmission speeds of the L-band signals are 2.5 Gb/s, 622 Mb/s, and 155 Mb/s, respectively. On the other hand, the average Q penalties of the L-band signals are 0.6 dB, 2.2 dB, and 4.6 dB when the transmission speeds of the C-band signals are 2.5 Gb/s, 622 Mb/s, and 155 Mb/s, respectively. That is, as the transmission speed of the signals of the opposite band decreases, serious performance degradation occurs. Here, the Q penalty denotes the difference between the transmission performance Q of 10 Gb/s and that of 2.5 Gb/s, 622 Mb/s, 155 Mb/s. In addition, the Q penalty is represented on a dB scale. Meanwhile, the performance degradation of the signals is more serious in the long wavelength band than in the short wavelength band, particularly, when the transmission speed of the signals in the short wavelength band is low.

Such an effect occurs due to the characteristic of a Raman crosstalk where a walk-off length is relatively long in a small dispersion region so that an amount of time for progressing adjacent channels together is relatively large. Accordingly, the short wavelength channels generate Raman crosstalk in the long wavelength channels. Therefore, the long wavelength channels are affected more by the Raman crosstalk than the short wavelength channels. In addition, when the transmission speed of the signals is low, quite serious walk-off length is relatively increased, so the effect of the Raman crosstalk is increased. Thus, when the speed of the short wavelength channels is low, the serious performance degradation occurs. Here, the walk-off length due to a difference between group velocities by dispersion denotes the distance of one bit delay between the adjacent channels.

Since the dispersion in the short wavelength band is smaller than that in the long wavelength band in the WDM system, the effect of the Raman crosstalk can be minimized by allotting the channels having the low transmission speed to the long wavelength band in the multirate WDM system.

FIG. 3 is a flowchart for explaining a channel allocation method according to the present invention.

In other words, FIG. 3 is a flowchart for explaining a channel allocation method for minimizing the performance degradation due to the Raman crosstalk in the WDM system using a large bandwidth. Referring to FIG. 3, a channel having the lowest transmission speed is selected from not allotted channels, in step S310. Thereafter, the selected channel is allotted to the longest wavelength of empty wavelengths, in step S320. It is determined whether channels not allotted to the wavelength exist in step S330. When it is determined that channels not allotted to the wavelength exist, the channel having the lowest transmission speed is selected from the channels not allotted yet, in step S340. Thereafter, step S320 is repeated. As a result, the channels having the high transmission speed are allotted to the short wavelength band, and the channels having the low transmission speed are allotted to the long wavelength band.

As described above, the channel allocation method according to the present invention is applied to the multirate WDM system in order to allot the channels having the low transmission speed to the long wavelength band and the channels having the high transmission speed to the short wavelength band. Thus, the performance degradation due to the Raman crosstalk can be minimized.

While this invention has been particularly shown and described with reference to a preferred embodiment thereof, it will be understood by those skilled in the art that various changes in form and details may be made therein without departing from the spirit and scope of the invention as defined by the appended claims.

What is claimed is:

1. A channel allocation method in a multirate optical WDM transmission system, the method comprising:
   selecting a channel having the lowest transmission speed from a plurality of unallocated channels;
   allocating the selected channel to the longest wavelength band of a plurality of empty wavelength bands; and
   determining whether unallocated channels are left from the plurality of unallocated channels to repeatedly perform selecting the channel having the lowest transmission speed from the plurality of unallocated channels and allocating the selected channel to the longest wavelength band of the empty wavelength bands in order from the channel with the lowest transmission speed to a channel with a highest transmission speed, until all the channels of the plurality of unallocated channels are allocated, wherein the allocation of selected channels from the plurality of unallocated channels reduces an effect of Raman crosstalk in the WDM transmission system.

2. The method of claim 1, wherein the allotting of the selected channel comprises allotting the selected channel to longest unused wavelength band of a short wavelength band of C-band and a long wavelength band of L-band.

* * * * *